United States Patent
Takagishi (12)

(10) Patent No.: US 6,437,549 B1
(45) Date of Patent: Aug. 20, 2002

(54) BATTERY CHARGER

(75) Inventor: Hideto Takagishi, San Jose, CA (US)

(73) Assignee: Monolithic Power Systems, Inc., Santa Clara, CA (US)

( * ) Notice: Subject to any disclaimer, the term of this patent is extended or adjusted under 35 U.S.C. 154(b) by 20 days.

(21) Appl. No.: 09/653,114

(22) Filed: Aug. 31, 2000

(51) Int. Cl.[7] ................................................. G05F 1/40
(52) U.S. Cl. ...................................... 323/282; 323/284
(58) Field of Search ................................ 323/224, 282, 323/284, 222, 225, 350; 363/41

(56) References Cited

U.S. PATENT DOCUMENTS 6,307,356 B1 * 10/2001 Dwelley ..................... 323/282

* cited by examiner

Primary Examiner—Bao Q. Vu
Assistant Examiner—Gary L. Laxton
(74) Attorney, Agent, or Firm—Perkins Coie LLP

(57) ABSTRACT

A battery charger is provided that does not sink current from the battery during a reverse mode of operation. The battery charger includes upper and lower switching circuits, which alternately activate and deactivate to provide outgoing current flow. A comparator is coupled to the lower switching circuit to detect current flow into the upper and lower switching circuits. If this current flow is detected, a control circuit is provided that will deactivate the lower switching circuit to prevent subsequent incoming current flow. Further, a transistor is coupled to the lower switching circuit to detect the incoming current flow.

7 Claims, 1 Drawing Sheet

BATTERY CHARGER

BACKGROUND OF THE INVENTION

1. Field of the Invention

The present invention relates generally to battery chargers, and in particular, relates to a battery charger having circuitry that prevents current flow back to the battery charger from the battery during a reverse mode of operation.

2. Background Information

Efficient chargers for portable battery-powered equipment are more in demand now than ever before. Users want the battery charged quickly and yet want the charger to be small. In order to make a smaller, high-powered charger the efficiency must be increased—otherwise, the power dissipated inside the charger will cause it to overheat and fail. As a result, many chargers are being implemented as switching regulators.

Another trend in portable battery-powered system design that affects the performance of the charger is that present portable equipment battery packs have fewer cells than in the past. The advantage of using fewer cells is that the equipment can be made smaller and lighter. This means that the total voltage of the battery pack is lower now than it was in older systems.

The losses in a switching regulator can be separated into two categories: switching losses and conduction losses. In general, switching losses are associated with transitions/edges of a rectangular waveform at the output of power switches of the switching regulator, and include terms such as driver losses and current conduction during the transitions. Conduction losses are associated with the flat top and bottom of the rectangular waveform at the output of the power stage, and include the Ohmic losses in the power switches, the forward (non-Ohmic) drop of the power switches, and the Ohmic losses in an inductor of an output filter.

In the simplest version of a buck switching regulator, the lower switch is implemented with a "catch" diode. A disadvantage of this type of switching regulator is that the conduction losses of the lower switch become more significant as the output voltage is lowered. The efficiency of a low voltage switching regulator can be improved significantly if the catch diode is replaced by a power transistor that is switched at exactly the right time. This power transistor is often called a "synchronous rectifier."

Most switching regulators available today are not intended to be used as battery chargers. Many switching regulators are available that use standard catch diodes as the lower switch, and switching regulators with built-in synchronous rectifiers are becoming available. The switching regulators using catch diodes generally behave well as battery chargers, but are not as efficient as the switching regulators that use synchronous rectifiers. The switching regulators that use synchronous rectifiers are efficient but do not behave very well when their primary source of power is removed.

For example, the problem with the synchronous buck switching regulator used as a battery charger is that the load (e.g., the battery) is also a power source, and the "synchronous rectifier" is not really a rectifier because, when it is turned on, it can conduct current in either direction. In fact, the entire switching regulator is (in some sense) symmetric in that it can either transmit power from its input to its output (the normal "buck" direction), or it can transmit power from its output to its input (the reverse "boost" direction). As a result, if the primary power source (e.g., input) is turned off, the synchronous buck switching regulator can draw power from the battery and charge its input filter capacitor. The voltage on the input filter capacitor will increase until some component breaks down. This is a problem that requires special attention on the part of a charger designer.

An attempted solution is to add a large, high current rectifier diode in series with the output filter inductor. Doing this prevents current flow from the battery back into the buck switching regulator and eliminates the undue discharge of the battery. However, adding this diode reintroduces the conduction loss that the synchronous buck switching regulator is supposed to eliminate. Buck switching regulators that use a catch diode as the lower switch are not able to enter the reverse mode of operation because the diode only conducts current in one direction. However, as described above, such switching regulators suffer from switching and conduction losses that are impractical with low voltage, battery charger implementations.

Accordingly, improvements in battery charger circuitry are needed.

BRIEF DESCRIPTION OF THE DRAWINGS

A non-limiting and non-exhaustive embodiment of the present invention is described in the following figure.

DETAILED DESCRIPTION

Figure 1:
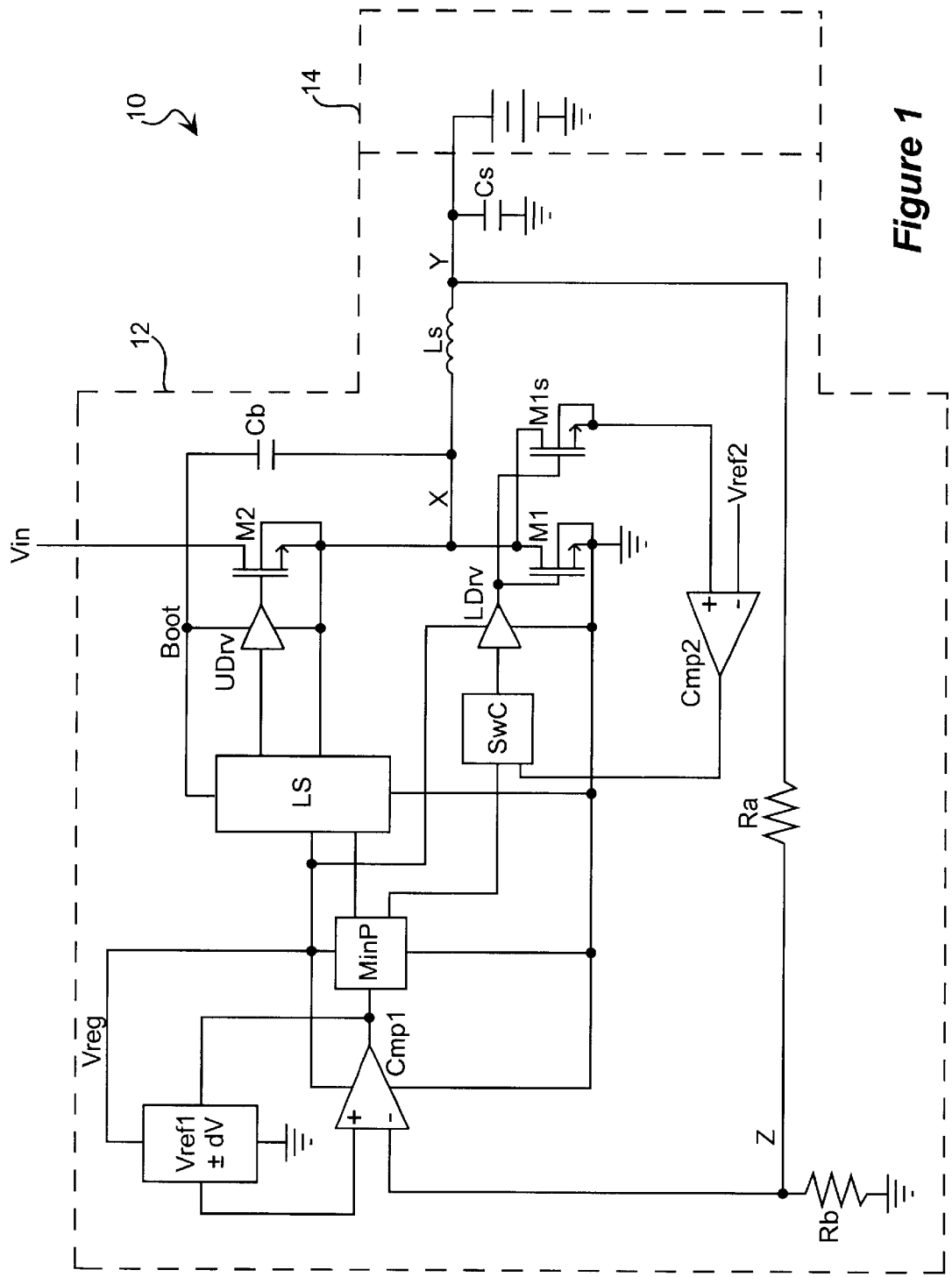
FIG. 1 is a circuit schematic showing a battery charger according to an embodiment of the invention.

Embodiments of an improved battery charger are described in detail herein. In the following description, numerous specific details are provided to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

An embodiment of the invention provides a synchronous buck switching regulator configured as a synchronous buck battery charger. When configured as a battery charger, the synchronous rectifier switch of the charger cannot sink current. This prevents the charger circuitry from entering the reverse or boost mode of operation.

Shown generally at 10 in FIG. 1 is an embodiment of a system according to the invention. The system 10 comprises a battery charger 12 and a load 14, which is typically a battery that is to be charged. The battery charger 12 includes a pair of transistors M1 and M2 that serve as power output switching devices that drive an output switching node X. In one embodiment, the transistors M1 and M2 can be N-channel or P-channel metal oxide semiconductor field effect transistors (MOSFETs) or N-channel junction field effect transistors (JFETs). In another embodiment, bipolar junction transistors (BJTs) may be used. It is to be appreciated that the transistors M1 and M2 may comprise any type of suitable switching device, such that in operation, one switching device is ON while the other switching device is OFF, or in operation, both switching devices are OFF.

The transistor M2 has its source terminal coupled to the node X, while the transistor M1 has its source terminal coupled to ground. A drain of the transistor M2 is connected to an input voltage Vin, which may be within the range of 7–25 volts (12 volts is typical) in one embodiment, for example, while a drain of the transistor M1 is coupled to the node X. As is understood by those skilled in the art, Vin can be a direct current (DC) voltage that is provided from an unregulated alternating current (AC) power supply via circuitry (not shown), with the circuitry including a step-down transformer, rectifier, input filter capacitor, electromagnetic interference filter, fuse, resistor across the filter capacitor, and other such components.

The transistor M1 and the transistor M2 function as switches that form part of an output stage for the battery charger 12 to produce a rectangular waveform output at the node X, when the output stage is used in a switch mode. Cross-conduction of the output stage is minimized or eliminated by conventional logic (not shown) in the battery charger 12. That is, such logic circuitry verifies that the transistor M2 is OFF before the transistor M1 turns ON, and vice versa.

The rectangular waveform at the node X is filtered by an inductor Ls and by a capacitor Cs coupled to ground, and then delivered to the battery of the load 14 via an output node Y. Example values for these circuit components in one embodiment can be Ls=47 $\mu$H and Cs=47 $\mu$F, and it is understood that other embodiments may utilize components having different values.

The signal at the node Y is fed back (negative feedback) to a summing node Z, via a network having a resistor Ra and a grounded resistor Rb. The resistors Ra and Rb function as a voltage divider and have values that can be determined by those skilled in the art.

The node Z is coupled to (or monitored by) an inverting input of a comparator Cmp1, which forms part of a driving stage for the battery charger 12. A non-inverting input of the comparator Cmp1 is biased to a reference voltage Vref1, which in one embodiment can be 2 volts±a small voltage dV that is coupled to and dependent on an output level of the comparator Cmp1. The small voltage dV represents a local hysteresis that causes the comparator Cmp1 to switch crisply. Hence, the comparator Cmp1 and the Vref1 and dV voltages cooperate to form what is commonly referred to as a "bang—bang controller."

The output of the comparator Cmp1 drives a minimum pulse block MinP that limits the minimum pulse width of the signals that are output from the comparator Cmp1. In one embodiment, the block MinP can time the minimum pulse widths at 1 $\mu$s, for example. The block MinP has two outputs having opposite logic states (e.g., if one output is a binary 1, the other output is a binary 0). One output of the block MinP drives an upper driver UDrv through a level-shift circuit LS, and the other output of the block MinP drives a lower driver LDrv via a switch control logic circuit SwC. Examples of specific circuitry for the block MinP, the level-shift circuit LS, and switch control logic circuit SwC are not described in detail herein because they are known in the art, or they can be designed based on the description provided herein of the various embodiments of the invention. For example, the switch control logic circuit SwC can comprise Boolean logic circuitry that generates a specific output signal state (e.g., binary 1 or binary 0) based on the state(s) of one or more of its inputs.

An output of the lower driver LDrv drives a gate of the transistor M1, and an output of the upper driver UDrv drives a gate of the transistor M2. The upper driver UDrv is biased by a floating power supply connected between the node X and a node Boot. According to one embodiment, a capacitor Cb (having a value of 22 nF, for example) provides the floating power supply voltage while the transistor M2 is on. This is similar to a conventional bootstrap drive technique that enables the gate of the transistor M2 to be driven above a positive power supply rail (e.g., above the input voltage Vin).

The capacitor Cb can be charged from a regulated power supply Vreg through a diode (not shown) while the node X is low. The regulated power supply Vreg can also bias the comparator Cmp1, the block MinP, part of the level-shift circuit LS, the lower driver LDrv, and other circuitry (not shown). An example value in one embodiment for the regulated power supply Vreg is 5 volts, and it is understood that different values for Vreg may be suitable for other embodiments.

While specific circuitry for the driving stage of the battery charger 12 has been described herein and shown in FIG. 1 (e.g., the comparator Cmp1, level-shift circuit LS, the block MinP, bang—bang controller, feedback network from the node Y, etc), it is to be appreciated that this circuitry reflects merely an example of a type of driving stage that may be utilized. Other types of circuitry, circuit configurations, circuit components, etc. may be used for the driving stage of the battery charger 12, such that the driving stage can suitably control the alternate switching ON/OFF of the transistors M1 and M2, via the upper driver UDrv and the lower driver LDrv, in a manner consistent with synchronous buck switching regulator operation for a battery charger and in a manner consistent with principles of the invention.

To detect and address a potential reverse mode of operation, an embodiment of the battery charger 12 includes a transistor M1s having a gate coupled to the output of the lower driver LDrv and a drain coupled to the node X. A source of the transistor M1s is coupled to a non-inverting input of a comparator Cmp2, while an inverting input of the comparator Cmp2 is coupled to receive a reference voltage Vref2. In an embodiment, the reference voltage Vref2 can be positive, negative, or zero, such as a voltage within the range of −100 mV to +100 mV. An output of the comparator Cmp2 is coupled to the switch control logic circuit SwC.

Operation of the system 10 during a potential reverse mode of operation (e.g., if the battery charger 12 is "unplugged" while the battery in the load 14 is still connected to the battery charger 12) is as follows. The voltage on the drain of the lower transistor M1 is transmitted through the transistor M1s only when the lower transistor M1 is ON. The comparator Cmp2 compares the voltage on the drain of the transistor M1 with the small positive reference voltage Vref2, while the transistor M1s is ON. During the reverse mode of operation, the voltage at the node X is initially at zero volts and begins to become more positive, as current begins to flow from right to left through the inductor Ls.

When the drain (connected to the node X) of the transistor M1 becomes more positive than the reference voltage Vref2 (e.g., the comparator's Cmp2 threshold is crossed), the output of the comparator Cmp2 causes the switch control logic circuit SwC to output a signal, via the lower driver LDrv, to turn the transistor M1 OFF. This makes the transistor M1 behave like an ideal diode, and the battery charger 12 is prevented from entering the reverse mode of operation (e.g., is prevented from sinking current coming from the load 14). The battery charger 12 can be thought of as entering a power-saving "sleep mode" in this situation.

Operation of the system 10 during the normal mode of operation, when the battery of the load 14 is being charged, is as follows. The signal at the node Z of the comparator Cmp1 is compared to Vref±dV. In this situation, the signal at the node Z is derived from a substantially DC signal at the node Y, and hence the node Z input into the comparator Cmp1 is a substantially DC signal. By comparing the signal at the node Z with Vref±dV (if a bang—bang configuration is used for the driving stage), the output of the comparator Cmp1, in effect, depends on the signal at the node Z and on its recent history (e.g., the hysteresis). The output of the comparator Cmp1, as a result, is a rectangular waveform that transitions between binary 0 and binary 1 levels.

This rectangular waveform output signal of the comparator Cmp1 is fed into the block MinP. As described above, the block MinP has two outputs at simultaneously different logic states. Hence, the rectangular waveform output signal of the comparator Cmp1 causes the block MinP to drive the upper driver UDrv the and lower driver LDrv to turn ON/OFF the transistors M2 and M1, respectively. As a result of the switching action of the transistors M1 and M2, a rectangular waveform is generated at the node X that is a version (e.g., may be amplified in one embodiment) of the rectangular waveform generated at the output of the comparator Cmp1.

The rectangular waveform at the node X is filtered by the inductor Ls and the capacitor Cs. More specifically, because the current through the inductor Ls and the voltage across the capacitor Cs do not change instantaneously, these components provide a filter that "smooths" the rectangular waveform coming from the node X. As a result, substantially DC output signal is provided to the load 14 at the node Y.

In an embodiment, if the input voltage Vin is at 12 volts, the rectangular waveform at the node X transitions between 12 volts and 0 volts (e.g., the rectangular waveform "bangs" between 12 volts and 0 volts). In this manner, when the transistor M2 is ON and the transistor M1 is OFF, 12 volts can be provided to the load 14. When the transistor M1 is ON and the transistor M2 is OFF, the current goes from ground to the drain of the transistor M1, through the inductor Ls, and then to the load 14. In this manner of normal operation, the battery in the load 14 is charged.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

For instance, while specific component values and voltage values are provided herein, it is to be appreciated that these values are for the sake of illustration and explanation. Various embodiments of the invention may utilize values that are different from what is specified herein.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus, comprising:

upper and lower switching circuits, the upper and lower switching circuits capable of alternate activation and deactivation during a first mode of operation to provide outgoing current flow during a first mode of operation, wherein the upper and lower switching circuits respectively comprise first and second transistors, the second transistor having a control terminal coupled to a control logic circuit and being responsive to the control logic circuit to activate and deactivate;

a comparator coupled to the lower switching circuit, the comparator being coupled to compare a first voltage, associated with the lower switching circuit, with a second voltage, and to generate a signal if the first voltage is different from the second voltage;

the control logic circuit coupled to receive the signal from the comparator and to trigger deactivation of the lower switching circuit to prevent subsequent incoming current flow during a second mode of operation; and a third transistor having a control terminal coupled to the control logic circuit, a first terminal coupled to a first terminal of the second transistor, and a third terminal coupled to an input of the comparator to provide the first voltage to the comparator.

2. The apparatus of claim 1 wherein during the second mode of operation, the first voltage becomes increasingly positive as an initial incoming current flow occurs, the lower switching circuit being capable of activation as the first voltage becomes increasingly positive and to provide the first voltage to the comparator for comparison with the second voltage.

3. The apparatus of claim 1 wherein another input of the comparator is coupled to receive the second voltage.

4. The apparatus of claim 1 wherein the comparator is capable of generating the signal if the first voltage exceeds the second voltage, to indicate the second mode of operation and to trigger deactivation of the lower switching circuit.

5. The apparatus of claim 4 wherein the comparator is capable of generating the signal to have a first state if the first voltage exceeds the second voltage, to cause the control logic circuit to trigger deactivation of the lower switching circuit.

6. The apparatus of claim 5 wherein the comparator is capable of generating the signal to have a second state different from the first state if the second voltage exceeds the first voltage, to cause the control logic circuit to maintain activation of the lower switching circuit.

7. The apparatus of claim 1, further comprising a driving stage, having a bang—bang controller, to trigger activation and deactivation of the upper and lower switching circuits during the first mode of operation.

* * * * *